Patented Sept. 16, 1952

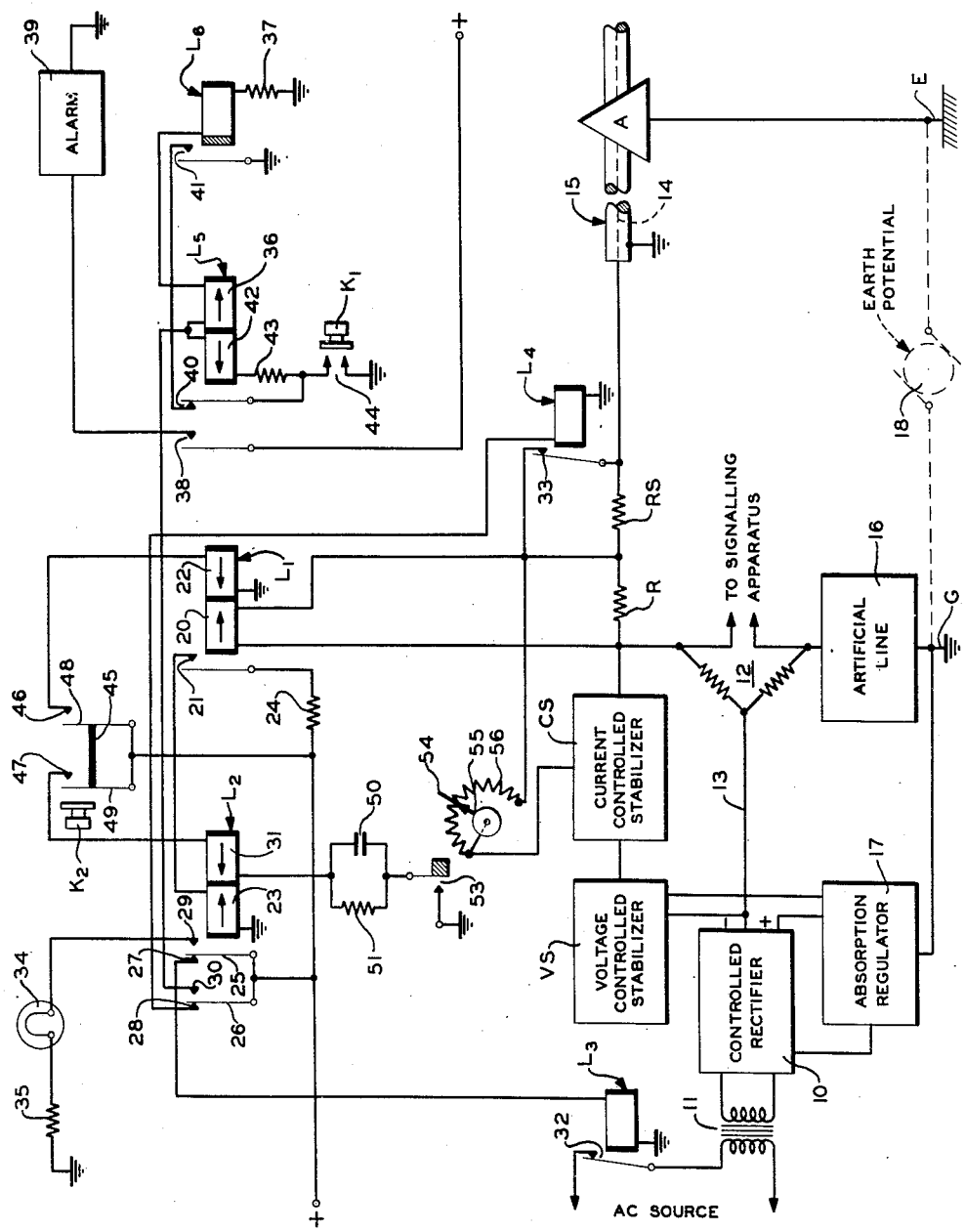

2,611,032

UNITED STATES PATENT OFFICE 2,611,032

SUBMARINE CABLE OVERCURRENT PROTECTIVE DEVICE

Philip H. Wells, Chatham, N. J., and Clifford H. Cramer, Great Neck, N. Y., assignors to The Western Union Telegraph Company, New York, N. Y., a corporation of New York Application May 31, 1951, Serial No. 229,195

10 Claims. (Cl. 178—69)

The present invention relates to submarine cables and more particularly to submarine cables having repeating amplifiers incorporated therein.

As described in the copending patent application of H. F. Wilder, Serial No. 229,146, filed May 31, 1951, inclusion of a repeating amplifier in a remote portion of a submarine cable circuit provides many advantages, such as a large increase in the speed of telegraphic communication over the cable.

Since a repeating amplifier in a submarine cable circuit will be located a considerable distance from a terminal station and since such an amplifier will generally be located in a submerged portion of the cable, it is necessary to supply amplifier operating power thereto from a shore station. For stable repeating amplifier operation, it is desirable that the operating current for the amplifier be maintained substantially constant. This latter condition is difficult to achieve in practice because of the presence of earth potentials induced in the cable circuit and which may be of positive or negative polarity. These earth potentials may have values of from 0 to 300 or more volts and may, in some instances, produce currents in the cable circuit sufficiently large to damage the cable.

In the copending patent application of Philip H. Wells et al., Serial No. 229,194, filed May 31, 1951, there is illustrated a power supply for use with a submerged repeater and in which the current supplied to a repeating amplifier is maintained substantially constant over a wide range of variations in earth potentials and commercial alternating current voltage.

Since a submarine cable may be seriously damaged if the current therethrough becomes excessive, and since the control range of the current and voltage control circuits may be exceeded, it is desirable that an overcurrent protective device be provided to open the power supply and insert impedance in series with the cable when the current therethrough exceeds a predetermined value.

Accordingly, it is an object of the invention to provide an overcurrent protective device for a submarine cable.

More particularly, it is an object of the invention to provide an overcurrent protective device for a submarine cable having a repeating amplifier incorporated in an intermediate portion thereof which will open the repeating amplifier power supply circuit and insert impedance in series with the cable when the current therethrough exceeds a predetermined value.

Another object of the invention is to provide an overcurrent protective device of the above type, wherein operating personnel may not restore the cable to service without adequate protection aginast a continued existence of the dangerous condition.

Further, objects of the invention will appear from the following description.

In accordance with the invention, these objects are achieved by providing means responsive to an excess current flow in the cable circuit to disable the power supply, to interpose a protective impedance element in the cable circuit and to provide an alarm indication to operating personnel, and manually operable means, operable solely when the power supply is adjusted to deliver a minimum current, to render the power supply operative and to remove the protective impedance element from the cable circuit.

The invention will now be described in greater detail with reference to the appended drawing in which there is illustrated one embodiment of the overcurrent protective device according to the invention.

Referring now to the drawing, power from an alternating current source is applied to a controlled rectifier 10 through a transformer 11. The negative terminal of rectifier 10 is connected to the apex of a cable bridge 12 through a conductor 13. One arm of cable bridge 12 is coupled to a conductor 14 of submarine cable 15 through series connected resistors R and RS. The other arm of cable bridge 12 is coupled to ground through an artificial line 16. The positive terminal of rectifier 10 is coupled to ground through an absorption type regulator 17. Negative polarity is applied to cable conductor 14 to minimize electrolytic effects at the casing of a repeating amplifier A interposed in cable 15 in a submerged portion thereof. Earth potentials, which vary in magnitude and polarity, are represented as a generator 18 interposed between station ground G and repeater earth E.

A voltage controlled stabilizer VS and a current controlled stabilizer CS are provided to maintain the rectified voltage substantially independent of variations in the A. C. source and to maintain the direct current supplied to amplifier A substantially constant despite wide variations in earth potentials. The circuit details and method of operation of the regulated power supply described above are fully disclosed in the copending patent application of Philip H. Wells et al. referred to hereinbefore. It is to be understood that the invention is not limited to use with the power supply described in the said application of Philip H. Wells et al., but is equally applicable to any power supply suitable for supplying a remote repeating amplifier included in a submarine cable circuit.

When the cable current exceeds a predetermined maximum value, the voltage drop across resistor R becomes sufficient to energize a principal winding 20 of relay L1, winding 20 being shunted across resistor R. Energization of winding 20 causes normally open contacts 21 to close. Once closed, contacts 21 will not reopen upon deenergization of winding 20. To reopen contacts 21, reset winding 22 of relay L1 must be energized. Closing of contacts 21 completes an energizing circuit for principal winding 23 of a relay L2 from positive battery through resistor 24, contacts 21 and winding 23 to ground. Energization of winding 23 causes armatures 25 and 26 to break with back contacts 27 and 28, respectively, and to make with front contacts 29 and 30, respectively. Once armatures 25 and 26 are made with contacts 29 and 30, respectively, they will not return to contacts 27 and 28, respectively, until a reset winding 31 of relay L2 is energized.

In the normal positions of armatures 25 and 26, circuits are completed from positive battery through armature 25, contact 27 and relay L3 to ground and from positive battery through armature 26, contact 28 and relay L4 to ground. Normally closed contacts 32 of relay L3 are included in the primary side of transformer 11, so that deenergization of relay L3 will open the supply circuit for rectifier 10. Normally closed contacts 33 of relay L4 are arranged to short resistor RS out of the cable circuit, so that deenergization of relay L4 will place resistor RS in the cable circuit as a protective resistor. Since contacts 33 normally carry the relatively large repeater current and the signal current, it is desirable that contacts 33 provide a minimum resistance in the cable circuit. Relay L4 is, therefore, preferably realized as a mercury relay.

When relay winding 23 is energized, circuits are completed from positive battery through armature 25, contact 29, lamp 34 and resistor 35 to ground and from positive battery through armature 26, contact 30, winding 36 of a differential relay L5, slow acting relay L6 and resistor 37 to ground.

Lamp 34 provides a visual indication of an overcurrent condition in the cable current to operating personnel. Unlike the audible alarm to be described hereinafter, lamp 34 remains energized until the cable circuit is ready to be restored to operation.

Energization of winding 36 of relay L5 closes normally open contacts 38, thereby closing a circuit from positive battery through contacts 38 and alarm circuit 39 to ground to provide an audible indication of an overcurrent condition in the cable circuit to operating personnel. Energization of winding 36 also opens normally closed contacts 40. When slow acting relay L6 operates, normally open contacts 41 thereof close.

When an attendant presses button K1, a circuit is completed from positive battery through armature 26, contact 30, winding 42 of relay L5, resistor 43 and normally open contacts 44 to ground. Winding 42 is wound in opposition to winding 36 and energization of winding 42 will cause contacts 40 to return to their normally closed condition and contacts 38 to return to their normally open condition. The opening of contacts 38 will open the energizing circuit for alarm 39. Closing of contacts 40 will complete a locking circuit for winding 42 extending from positive battery through armature 25, contact 30, winding 42, resistor 43, contacts 40 and contacts 41 to ground. Accordingly, alarm 39 will remain deenergized after release of button K1 because winding 42 of relay L5 will remain energized through its locking circuit.

For placing the power supply circuit back in operation, there is provided a switch 45 having a pair of contacts 46 and 47 normally open with respect to a pair of tongues 48 and 49, respectively. Tongues 48 and 49 are made with contacts 46 and 47, respectively, when an attendant presses a button K2. When button K2 is pressed, an energizing circuit for reset winding 22 of relay L1 is completed from positive battery through tongue 48, contact 46 and winding 22 to ground. Energization of winding 22 opens contacts 21, thereby removing battery from winding 23 of relay L2. Pressing button K2 will also close an energizing circuit for reset winding 31 of relay L2 from positive battery through tongue 49, contact 47, winding 31, the parallel combination of a capacitor 50 and a resistor 51 and normally open contacts 53 to ground. Energization of winding 31 causes armatures 25 and 26 to break with contacts 29 and 30, respectively, and to make with contacts 27 and 28, thereby energizing relays L3 and L4. Energization of relay L3 closes contacts 32, applying power to the primary winding of transformer 11 thereby allowing rectifier 10 to deliver repeater operating current to the cable circuit. Energization of relay L4 closes contacts 33 thereby short-circuiting resistor RS.

It is important to note that the energizing circuit for reset winding 31 of relay L2 will not be closed unless contacts 53 are first closed. Contacts 53 are closed by an extension 54 of a slider 55 of a current control potentiometer 56. Extension 54 closes contacts 53 only when slider 55 adjusts potentiometer 56 to maximum resistance. Since potentiometer 56 is in the input circuit to current controlled stabilizer CS, it adjusts stabilizer CS to provide minimum current from rectifier 10. Adjustment of slider 55 to the minimum current position is a condition precedent to energization of winding 31 and hence insures that the cable circuit will be protected from damage which could occur if full current were returned thereto with a continued abnormal earth potential condition.

If a device were provided for varying the voltage applied to rectifier 10, switch 53 could conveniently be arranged to close only on a minimum voltage setting, thereby providing substantially the same protection as the arrangement illustrated.

Further protection against a continued abnormal earth current condition is provided by capacitor 50, which is shunted by high resistance 51. Current will flow through capacitor 50 only until it is charged, at which time the energizing circuit for winding 31 will be opened. Accordingly, continued depression of button K2 will not maintain energization of relays L3 and L4 if the current through resistor R is in excess of the predetermined maximum safe value. If the abnormal earth potential condition has cleared, the circuit will return to normal upon depression of button K2 and the cable current can be adjusted to the proper value by adjusting slider 55.

It will be evident that the cable will be protected from excessive earth currents in the event of a station power failure because such a failure will automatically deenergize relays L3 and L4, placing the cable in its protected condition.

While the invention has been described in a particular use thereof and in a particular embodiment, it is not desired that it be limited thereto, for obvious modifications thereof will occur to those skilled in the art without departing from the spirit and scope of the invention as set forth in the appended claims.

What is claimed is:

1. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising means selectively to disable said source, a second impedance element, circuit means selectively to interpose said second impedance element in said cable circuit, means responsive to a flow of current through said first impedance element in excess of a predetermined maximum value to actuate said disabling means and said circuit means thereby to disable said source and to interpose said second impedance element in said cable circuit, first manually operable means coupled to said control circuit to adjust said control circuit for a predetermined minimum current flow from said source, second manually operable means to actuate said disabling means and said circuit means thereby to render said source operative and to remove said second impedance element from said cable circuit and means coupled to said second manually operable means and arranged to permit operation thereof solely when said control circuit is adjusted for said predetermined minimum current flow from said source.

2. In a terminal station for a submarine cable circuit having a repeating amplifier interposed in a submerged portion thereof and being subjected to varying earth potentials, the combination comprising a source of direct current power for said amplifier, a control circuit coupled to said source to control the magnitude of the current delivered therefrom, a first resistance element intercoupling said source and said cable circuit, and an overcurrent protection device comprising means selectively to disable said source, a second resistance element, circuit means selectively to interpose said second resistance element in said cable circuit, means responsive to a flow of current through said first resistance element in excess of a predetermined maximum value to actuate said disabling means and said circuit means thereby to disable said source and to interpose said second resistance element in said cable circuit, first manually operable means coupled to said control circuit to adjust said control circuit for minimum current flow from said source, second manually operable means to actuate said disabling means and said circuit means thereby to render said source operative and to remove said second resistance element from said cable circuit and means coupled to said second manually operable means and arranged to permit operation thereof solely when said control circuit is adjusted for minimum current flow from said source.

3. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising first relay means selectively to disable said source, a second impedance element, second relay means selectively to interpose said second impedance element in said cable circuit, third relay means responsive to a flow of current through said first impedance element in excess of a predetermined maximum value to actuate said first relay means and said second relay means thereby to disable said source and to interpose said second impedance element in said cable circuit, first manually operable means coupled to said control circuit to adjust said control circuit for minimum current flow from said source, second manually operable means to actuate said third relay means thereby to actuate said first and second relay means and to render said source operative and to remove said second impedance element from said cable circuit and circuit means coupled to said third relay means and arranged to permit operation thereof solely when said control circuit is adjusted for minimum current flow from said source.

4. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising means selectively to disable said source, a second impedance element, circuit means selectively to interpose said second impedance element in said cable circuit, means responsive to a flow of current through said first impedance element in excess of a predetermined maximum value to actuate said disabling means and said circuit means thereby to disable said source and to interpose said second impedance element in said cable circuit, first manually operable means coupled to said control circuit to adjust said control circuit for minimum current flow from said source, second manually operable means to actuate said disabling means and said circuit means thereby to render said source operative and to remove said second impedance element from said cable circuit and protective means coupled to said second manually operable means and arranged to permit operation thereof solely when said control circuit is adjusted for minimum current flow from said source, said protective means including a time delay circuit arranged to suppress operation of said second manually operable means after operation thereof for a predetermined time interval.

5. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising means selectively to disable said source, a second impedance element, circuit means selectively to interpose said second impedance element in said cable circuit, means responsive to a flow of current through said first impedance element in excess of a predetermined maximum value to actuate said disabling means and said circuit means thereby to disable said source and to interpose said second impedance element in said cable circuit, first manually operable means coupled to said control circuit to adjust said control circuit for minimum current flow from said source and second manually operable means to actuate said disabling means and said circuit means thereby to render said source operative and to remove said second impedance element from said cable circuit.

6. In a terminal station for a submarine cable circuit having a repeating amplifier interposed in a portion thereof remote from said station, said cable circuit being subjected to varying earth potentials, the combination comprising a source of direct current power for said amplifier, a control circuit coupled to said source to control the magnitude of the current delivered therefrom, a first impedance element intercoupling said source and said cable circuit, and an overcurrent protection device comprising means selectively to disable said source, circuit means selectively to protect said cable circuit from excessive earth potentials, means responsive to a flow of current through said first impedance element in excess of a predetermined maximum valve to actuate said disabling means and said circuit means thereby to disable said source and to protect said cable circuit from excessive earth potential, means coupled to said control circuit to adjust said control circuit for a predetermined minimum current flow from said source, and means to actuate said disabling means and said circuit means thereby to render said source operative and to suppress protection of said cable circuit from excessive earth potentials.

7. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising a first relay having an operating winding and a reset winding, said operating winding of said first relay being coupled to said first impedance element and being energized solely when the current through said first impedance element exceeds a predetermined value, a second relay having an operating winding and a reset winding, means intercoupling said first relay and the operating winding of said second relay to energize the operating winding of said second relay upon energization of the operating winding of said first relay, first circuit means selectively to disable said source, a second impedance element, second circuit means selectively to interpose said second impedance element in said cable circuit, an alarm circuit, means responsive to energization of the operating winding of said second relay to operate said first and second circuit means and to energize said alarm circuit thereby to disable said source, to interpose said second impedance element in said cable circuit and to provide an over-current alarm indication, first manually operable means coupled to said control circuit to adjust said control circuit for minimum current flow from said source, second manually operable means to energize the reset windings of said first and second relays thereby to operate said first and second circuit means and to deenergize said alarm circuit thereby to render said source operative, to remove said second impedance element from said cable circuit and to suppress said alarm indication and means coupled to said reset winding of said second relay and to said first manually operable means to permit energization of the reset winding of said second relay solely when said control circuit is adjusted for minimum current flow from said source.

8. In a terminal station for a submarine cable circuit having a repeating amplifier interposed in a portion thereof remote from said station, the combination comprising a source of direct current for said amplifier, a control circuit coupled to said source to control the magnitude of the current delivered therefrom, a first impedance element intercoupling said source and said cable circuit, and an overcurrent protection device comprising a first relay having an operating winding and a reset winding, said operating winding of said first relay being coupled to said first impedance element and being energized solely when the current through said first impedance element exceeds a predetermined value, a second relay having an operating winding and a reset winding, means intercoupling said first relay and the operating winding of said second relay to energize the operating winding of said second relay upon energization of the operating winding of said first relay, first circuit means selectively to disable said source, a second impedance element, second circuit means selectively to interpose said second impedance element in said cable circuit, an alarm circuit, means responsive to energization of the operating winding of said second relay to operate said first and second circuit means and to energize said alarm circuit thereby to disable said source, to interpose said second impedance element in said cable circuit and to provide an overcurrent alarm indication, first manually operable means coupled to said control circuit to adjust said control circuit for minimum current flow from said source, second manually operable means to energize the reset windings of said first and second relays thereby to operate said first and second circuit means and to deenergize said alarm circuit thereby to render said source operative, to remove said second impedance element from said cable circuit and to suppress said alarm indication and protective means coupled to said reset winding of said second relay and to said first manually operable means to permit energization of the reset winding of said second relay solely when said control circuit is adjusted for minimum current flow from said source, said protective means including a time delay circuit arranged to deenergize the reset winding of said second relay a predetermined time interval after energization thereof.

9. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising a first relay having an operating winding and a reset winding, said operating winding of said first relay being coupled to said first impedance element and being energized solely when the current through said first impedance element exceeds a predetermined value, a second relay having an operating winding and a reset winding, means intercoupling said first relay and the operating winding of said second relay to energize the operating winding of said second relay upon energization of the operating winding of said first relay, first normally energized relay means selectively to disable said source, a second impedance element, a second normally energized relay means selectively to interpose said second impedance element in said cable circuit, an alarm circuit, means responsive to energization of the operating winding of said second relay to deenergize said first and second relay means and to energize said alarm circuit thereby to disable said source, to interpose said second impedance element in said cable circuit and to provide an overcurrent alarm indication, first manually operable means coupled to said control circuit to adjust said control circuit for minimum current flow from said source, second manually operable means to energize the reset windings of said first and second relays thereby to energize said first and second relay means and to deenergize said alarm circuit thereby to render said source operative, to remove said second impedance element from said cable circuit and to suppress said alarm indication and protective means coupled to said reset winding of said second relay and to said first manually operable means to permit energization of the reset winding of said second relay solely when said control circuit is adjusted for minimum current flow from said source, said protective means including a time delay circuit arranged to deenergize the reset winding of said second relay a predetermined time interval after energization thereof.

10. In a terminal station for a submarine cable circuit having a repeating amplifier interposed in a portion thereof remote from said station, the combination comprising a source of direct current power for said amplifier, a control circuit coupled to said source to control the magnitude of the current delivered therefrom, a first impedance element intercoupling said source and said cable circuit, and an overcurrent protection device comprising a first relay having an operating winding and a reset winding, said operating winding of said first relay being coupled to said first impedance element and being energized solely when the current through said first impedance element exceeds a predetermined value, a second relay having an operating winding and a reset winding, means intercoupling said first relay and the operating winding of said second relay to energize the operating winding of said second relay upon energization of the operating winding of said first relay, first normally energized relay means selectively to disable said source, a second impedance element, second normally energized relay means selectively to interpose said second impedance element in said cable circuit, an audible alarm circuit, a visual alarm circuit, means responsive to energization of the operating winding of said second relay to deenergize said first and second relay means and to energize said alarm circuits thereby to disable said source, to interpose said second impedance element in said cable circuit and to provide visual and audible overcurrent alarm indications, first manually operable means to disable said audible alarm circuit, second manually operable means coupled to said control circuit to adjust said control circuit for minimum current flow from said source, third manually operable means to energize the reset windings of said first and second relays thereby to energize said first and second relay means and to deenergize said alarm circuits thereby to render said source operative, to remove said second impedance element from said cable circuit and to suppress said alarm indications and protective means coupled to said reset winding of said second relay and to said second manually operable means to permit energization of the reset winding of said second relay solely when said control circuit is adjusted for minimum current flow from said source, said protective means including a time delay circuit arranged to deenergize the reset winding of said second relay a predetermined time interval after energization thereof.

PHILIP H. WELLS.
CLIFFORD H. CRAMER.

No references cited.